US012806991B2

(12) United States Patent
Zanek et al.

(10) Patent No.: US 12,806,991 B2
(45) Date of Patent: Nov. 24, 2026

(54) VEHICLE TANK

(71) Applicant: MAGNA Energy Storage Systems GmbH Werk Schwäbisch Gmünd, Schwäblsch Gmünd (DE)

(72) Inventors: Steffen Zanek, Schwäbisch Gmünd (DE); Harry Wiese, Moegglingen (DE)

(73) Assignee: MAGNA Energy Storage Systems GmbH Werk Schwäbisch Gmünd, Schwäbisch Gmünd (DE)

( * ) Notice: Subject to any disclaimer, the term of this patent is extended or adjusted under 35 U.S.C. 154(b) by 63 days.

(21) Appl. No.: 18/502,042

(22) Filed: Nov. 5, 2023

(65) Prior Publication Data

US 2024/0181868 A1 Jun. 6, 2024

(30) Foreign Application Priority Data

Dec. 5, 2022 (EP) .................................... 22211362

(51) Int. Cl.
*B60K 15/03* (2006.01)

(52) U.S. Cl.
CPC .... *B60K 15/03* (2013.01); *B60K 2015/03131* (2013.01); *B60K 2015/03144* (2013.01); *B60K 2015/03217* (2013.01)

(58) Field of Classification Search
CPC .. B60K 2015/03105; B60K 2015/0344; B60K 2015/03144; B60K 2015/03131; B60K 2015/03217
USPC .......................................................... 220/563
See application file for complete search history.

(56) References Cited

U.S. PATENT DOCUMENTS 5,398,839 A * 3/1995 Kleyn .............. B60K 15/03177 220/555
5,979,485 A * 11/1999 Tuckey .............. F02M 37/0058 137/574
6,371,153 B1 * 4/2002 Fischerkeller ......... B60K 15/00 123/514

(Continued)

FOREIGN PATENT DOCUMENTS

DE 2602234 B1 4/1977
DE 29824173 U1 6/2000

(Continued)

OTHER PUBLICATIONS

European Search Report for Application No. 22211362.3; dated Jun. 27, 2023; 4 pages.

*Primary Examiner* — Stephen J Castellano
(74) *Attorney, Agent, or Firm* — Jordan IP Law, LLC; Todd A. Vaughn

(57) ABSTRACT

A motor vehicle tank comprises a main tank that includes at least one main extraction unit that has a main flow line for extracting fuel from the main tank; an auxiliary tank arranged adjacent to and connected with the main tank, the auxiliary tank including: an auxiliary extraction unit having an auxiliary flow line for extraction of fuel from the auxiliary tank, and a filler connection for direct filling of the auxiliary tank; a partition wall which separates the auxiliary tank from the main tank by a partition wall, the partition wall having a lower partition wall region without an opening in an installation position, and an upper partition wall region having at least one opening to form an overflow between the auxiliary tank and the main tank.

8 Claims, 2 Drawing Sheets

(56) References Cited

U.S. PATENT DOCUMENTS

| | | | | |
|---|---|---|---|---|
| 2008/0035649 | A1* | 2/2008 | Ohlsson ................. | B60K 15/03 220/564 |
| 2016/0069309 | A1* | 3/2016 | Takaoka ............. | F02M 37/0023 123/468 |
| 2020/0290455 | A1* | 9/2020 | Oliveira Capucho . | B60K 15/03 |

FOREIGN PATENT DOCUMENTS

| | | | |
|---|---|---|---|
| DE | 29824208 | U1 | 7/2000 |
| EP | 0976600 | A2 | 2/2000 |
| EP | 2832572 | A1 | 2/2015 |

* cited by examiner

VEHICLE TANK

CROSS-REFERENCE TO RELATED APPLICATIONS

The present application claims priority under 35 U.S.C. § 119 to European Patent Publication No. EP 22211362.3 (filed on Dec. 5, 2022), which is hereby incorporated by reference in its complete entirety.

TECHNICAL FIELD

One or more embodiments of this disclosure relates to a motor vehicle tank comprising a main tank.

BACKGROUND

Fuel-powered motor vehicles use a motor vehicle tank to carry the required fuel, in particular, a petrol fuel tank or a diesel fuel tank. Such fuel tanks have relatively large dimensions, in particular, for utility vehicles such as trucks, in order to carry larger quantities of fuel.

On first filling after manufacture of a motor vehicle, usually only small quantities of fuel are added to a motor vehicle tank. Since the fuel is distributed throughout the entire fuel tank, which may be correspondingly large in particular in the case of truck tanks and also have a complex shape, the use of the small first quantity in such a motor vehicle tank is difficult.

SUMMARY

The one or more embodiments of this disclosure provides an enhanced motor vehicle tank, and in particular, a low-cost motor vehicle tank which can be filled with a small first fill quantity of fuel which nonetheless can be reliably extracted and used.

In accordance with one or more embodiments, a motor vehicle tank comprises a main tank that includes at least one main extraction unit that has a main flow line for extracting fuel from the main tank; an auxiliary tank arranged adjacent to and connected with the main tank, the auxiliary tank including: (i) an auxiliary extraction unit having an auxiliary flow line for extraction of fuel from the auxiliary tank, and (ii) a filler connection for direct filling of the auxiliary tank; a partition wall which separates the auxiliary tank from the main tank by a partition wall, the partition wall having a lower partition wall region without an opening in an installation position, and an upper partition wall region having at least one opening to form an overflow between the auxiliary tank and the main tank.

In accordance with one or more embodiments, therefore, a lateral portion of a motor vehicle tank is configured as an auxiliary tank that is joined or otherwise connected to the main tank. The connection between the auxiliary tank and the main tank may be formed by tight welding, tight bonding, or the like. Between the main tank and the auxiliary tank is the partition wall which has no opening only in a lower partition wall region thereof, and hence forms the auxiliary tank reservoir in which fuel is collected which is not discharged to the main tank. The reservoir of the auxiliary tank, which is usually constantly full during operation, does not extend over the entire height of the motor vehicle tank, but only up to an upper edge of the auxiliary tank, which is formed by the lower limit of an opening or a lowermost opening in the partition wall. The opening or openings form at least one overflow into the main tank. The partition wall may, from this upper edge of the auxiliary tank, also perform the function of a baffle and hence form a baffle.

The auxiliary tank serves for filling the entire fuel tank. During filling, the fuel can overflow into the main tank through the opening or openings in the upper partition wall region of the partition wall. Fuel can be extracted both directly from the main tank and also directly from the auxiliary tank. The main flow line serves for extraction of fuel directly from the main tank. The auxiliary flow line serves for extraction of fuel directly from the auxiliary tank.

The partition wall is formed completely without openings in its lower region. It preferably also has no valves. The partition wall is therefore a simple wall with opening or openings in an upper partition wall region of the wall, and is therefore particularly cheap. The partition wall, together with the outer delimiting walls of the auxiliary tank, forms the auxiliary tank. This auxiliary tank may for example be attached to the main tank instead of an end cap which could otherwise be attached at this point, and hence may serve for modular retrofitting of a filling module to a motor vehicle tank.

Thus an economic and robust integration of a filling module can be achieved with simultaneous increase in the actual range, in particular, of a truck tank.

Further advantages of a technical solution derived in accordance with one or more embodiments are the fact that no additional container is required in the tank to form the auxiliary tank, and the associated fixing elements are omitted. A more robust design results. The probability of failure in operation is reduced because of the reduction in existing components and the use of proven simple components. No new interfaces are required. No special solution is required for servicing/maintenance of the auxiliary tank. A desired fill level of the auxiliary tank after first fill can be achieved in flexible fashion by selecting the position of the opening or openings or the hole pattern of the partition wall. A combination of a tank in a tank (metal or plastic) is not required. Lower investment costs may be necessary thanks to the use of existing processes and components for production of the motor vehicle tank. Filling is possible via substitute canisters, since only the auxiliary tank need be filled and the fuel supply restored. Usually, canister filling via the main tank is inadequate because of the distribution of fuel in the larger main tank.

In accordance with one or more embodiments, a valve, in particular, a float valve, which closes the main flow line if no fuel is present at the valve, is arranged at the end of the main flow line situated in the main tank. In this case, the main flow line is therefore closed and fuel can be extracted exclusively from the auxiliary tank.

In accordance with one or more embodiments, the main extraction unit comprises a fill level meter and/or a vent.

In accordance with one or more embodiments, the main flow line and the auxiliary flow line are connected together mechanically and/or fluid-conductively outside the outer delimiting walls of the motor vehicle tank. The two flow lines may also be mechanically coupled, e.g. attached to one another, and/or connected fluid-conductively into a common flow line so that the common flow line is guided to a consumer of the fuel.

In accordance with one embodiment, the main flow line and the auxiliary flow line may be mechanically connected together and/or fluidically connected inside the outer delimiting walls of the motor vehicle tank into a common flow line. The common flow line may be arranged in the main tank. The auxiliary flow line may branch from the common flow line, for example at a branch point and/or a valve. The auxiliary flow line branching off the common flow line may be guided through the partition wall into the auxiliary tank.

In accordance with one or more embodiments, the auxiliary extraction unit comprises an auxiliary return line for the return of extracted fuel directly to the auxiliary tank. The arrangement of the auxiliary tank "at the side" of the main tank means an arrangement at an edge, i.e. at a delimiting face of the main tank, i.e. not arranged inside or centrally in the main tank.

In accordance with one or more embodiments, the motor vehicle fuel tank preferably has the form of a cube or cylinder. The motor vehicle fuel tank preferably extends furthest in the longitudinal direction. The auxiliary fuel tank is preferably arranged next to the main tank in this longitudinal direction, in the manner of an end cap, or at the side in the transverse direction, normal to the longitudinal direction, i.e. laterally on the casing of the main tank. The main tank and/or the auxiliary tank and/or the partition wall preferably consist of metal, in particular steel. It is also possible for these components to be partially or completely made of plastic.

In accordance with one or more embodiments, at least one baffle is arranged in the main tank so as to divide the main tank into at two baffle regions of approximately equal size.

In accordance with one or more embodiments, a plurality of baffles are arranged in the main tank so as to divide the main tank into a plurality of baffle regions, the baffle regions being of approximately equal size.

In accordance with one or more embodiments, the main tank comprises no filler connection for direct filling of the main tank, so that the main tank can only be filled via the auxiliary tank. Thus an auxiliary tank, which has a simple partition wall with opening or openings in an upper partition wall region of the partition wall as an outer delimiting wall, may serve as a simple filling module for a fuel tank.

DRAWINGS

One or more embodiments of this disclosure will be illustrated by way of example in the drawings and explained in the description hereinbelow.

DESCRIPTION

Figure 2:
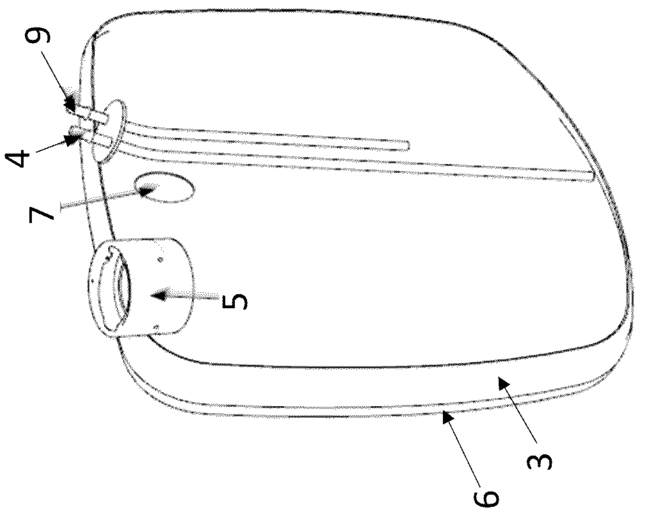
FIG. 2 illustrates a perspective view of the auxiliary tank of the motor vehicle tank of FIG. 1.
Figure 1:
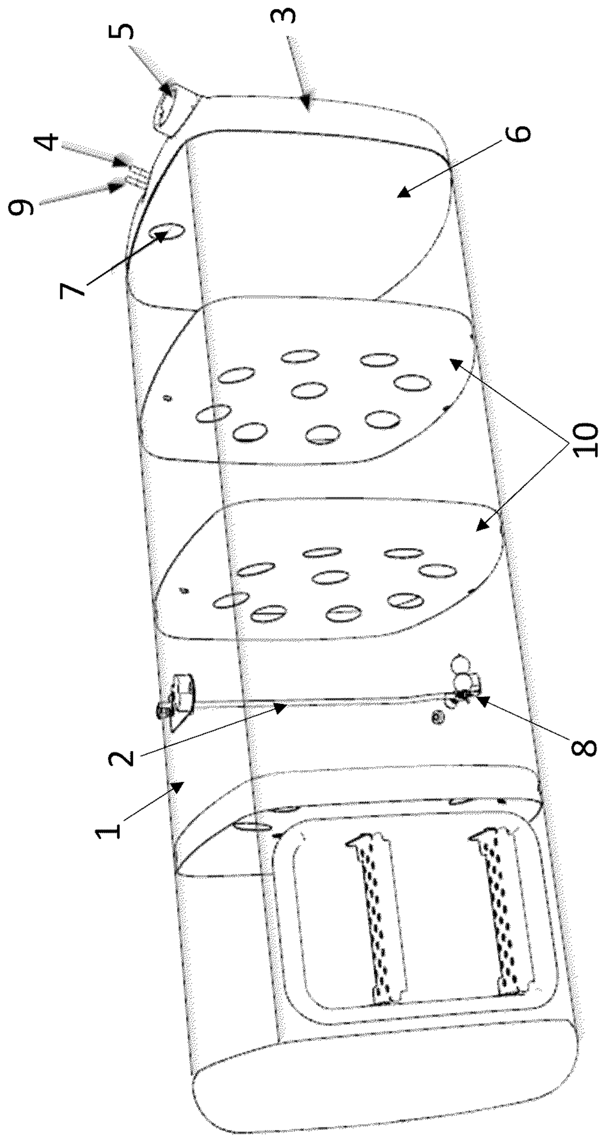
FIG. 1 illustrates a perspective view of a motor vehicle tank, in accordance with one or more embodiments.
Figure 3:
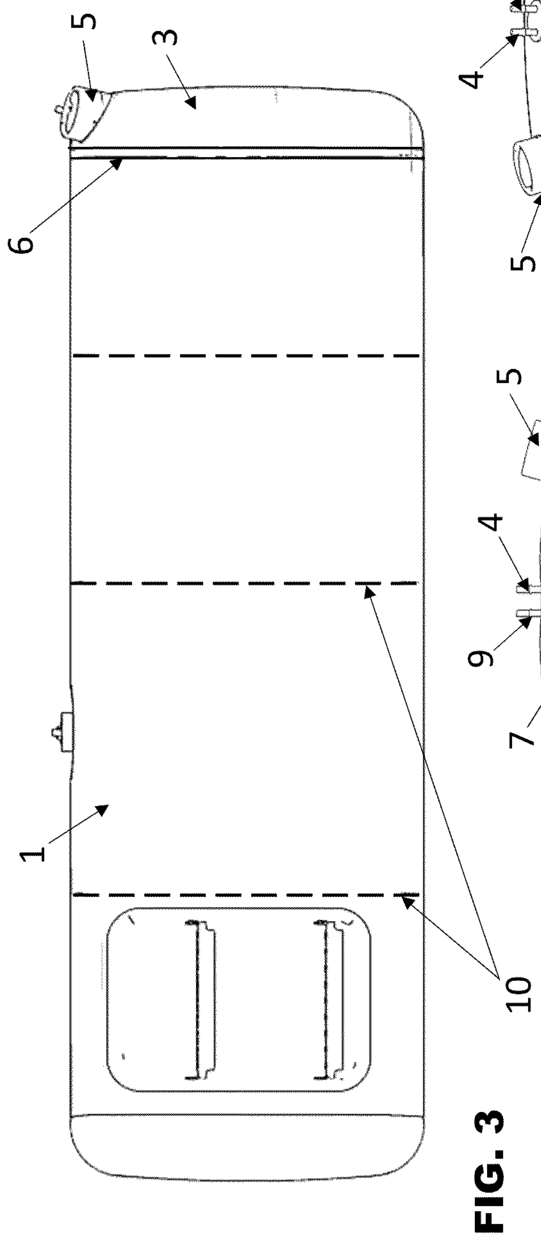
FIG. 3 illustrates a side view of the motor vehicle tank of FIG. 1.
Figure 4:
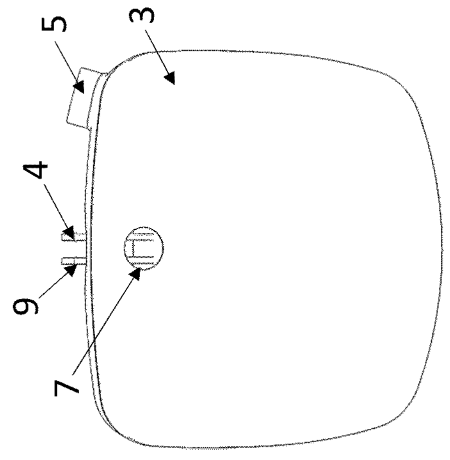
FIG. 4 illustrates a view of the auxiliary tank of FIG. 1 from the inside.
Figure 5:
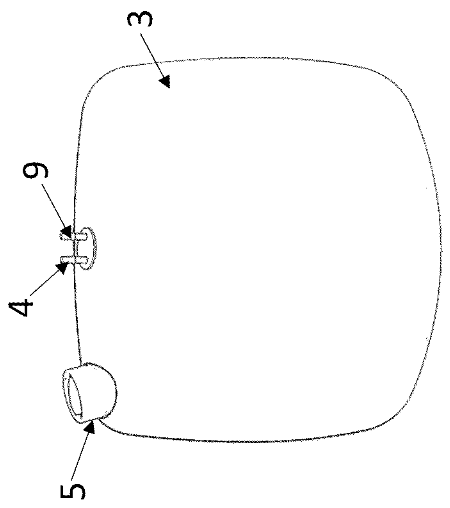
FIG. 5 illustrates a view of the auxiliary tank of FIG. 1 from the outside.

FIGS. 1 and 3 illustrate a motor vehicle tank in accordance with one or more embodiments. FIGS. 2, 4, and 5 illustrate the auxiliary tank alone.

The motor vehicle tank comprises a substantially cuboid main tank 1, that includes a main extraction unit having a main flow line 2 for extraction of fuel from the main tank 1. A valve 8 such as a float valve which closes the main flow line 2 when no fuel is present at the valve 8, is arranged at the end of the main flow line 2 situated in the main tank 1. The main extraction unit 2 also comprises a fill level meter and a vent.

A plurality of vertical baffles 10, each with several openings, are arranged in the main tank 1 to divide the main tank 1 into several regions or chambers.

The motor vehicle tank further comprises an auxiliary tank 3 arranged at the side of the main tank 1 and tightly connected (e.g., via weld) to the main tank 1. The auxiliary tank 3 comprises a filler connection 5 to facilitate direct filling of the auxiliary tank 3 and also indirect filling of the main tank 1. The main tank 1 does not have its own filler connection for direct filling of the main tank 1, so the main tank 1 can only be filled via the auxiliary tank 3 and the opening 7 in the partition wall 6. The auxiliary tank 3 is separated from the main tank 1 by a partition wall 6. The auxiliary tank 3 may be tightly welded to the main tank 1 in the region of the partition wall 6 by weld seams extending around the motor vehicle tank on the outside.

In an installation position, the partition wall 6 includes a lower partition region or portion that does not have an opening, and an upper partition region or portion that has at least one opening 7 or a plurality of openings 7 to form an overflow between the auxiliary tank 3 and the main tank 1.

The auxiliary tank 3 further comprises an auxiliary extraction unit that has an auxiliary flow line 4 for extraction of fuel from the auxiliary tank 3. The auxiliary tank 3 further comprises an auxiliary return line 9 for return of extracted fuel to the auxiliary tank 3. The main flow line 2 and the auxiliary flow line 4 are fluidically connected outside the outer delimiting walls of the motor vehicle tank in that they lead into a common flow line.

The main tank 1, the auxiliary tank 3 and the partition wall 6 may be formed of metal.

In accordance with an embodiment, the main flow line 2 and the auxiliary flow line 4 are mechanically connected and fluidically connected inside the outer delimiting walls of the motor vehicle tank. The fluidic connection is realized via a common flow line arranged in the main tank. The auxiliary flow line 4 branches off the common flow line, as does a short main flow line 2 with a float valve. The auxiliary flow line 4 branching off the common flow line is guided into the auxiliary tank through the partition wall. The common flow line is guided outward to a consumer through the delimiting walls of the motor vehicle tank.

By use of an auxiliary tank, which is separated from a main tank by a combination of baffle and partition wall, the necessary first fill quantity can be reduced, wherein the first fill quantity can be structured variably via the hole pattern of the partition wall. An improved extraction under certain driving situations—such as on a lateral slope, uphill and downhill travel—during use of the fuel tank by the end customer is also possible, as is a true increase in range of the motor vehicle since the switch points of the extraction unit can be designed more efficiently.

The terms "coupled," "attached," or "connected" may be used herein to refer to any type of relationship, direct or indirect, between the components in question, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Main tank
2 Main flow line of main extraction unit
3 Auxiliary tank
4 Auxiliary flow line
5 Filler connection
6 Partition wall
7 Opening
8 Valve
9 Auxiliary return line
10 Baffle

What is claimed is:

1. A motor vehicle tank, comprising:

a main tank without a filler connection and including a main flow line to facilitate extraction of fuel from the main tank, and a plurality of baffles to divide the main tank into a plurality of chambers, each baffle having a plurality of openings;

a unitary auxiliary tank reservoir weld connected to a side of the main tank to collect fuel, the auxiliary tank reservoir including a filler connection to facilitate direct filling of the auxiliary tank, a partition wall extending from a bottom of the motor vehicle tank to a top of the motor vehicle tank, the partition wall having a weld connection to the main tank and an opening that facilitates overflow of fuel between the auxiliary tank and the main tank in a manner that facilitates indirect filling of the main tank, and an auxiliary flow line to facilitate extraction of fuel from the auxiliary tank reservoir, and an auxiliary return line to facilitate return of the extracted fuel to the auxiliary tank, wherein the main flow line and the auxiliary flow line are fluidically connected outside outer delimiting walls of the motor vehicle tank to lead into a common flow line.

2. The motor vehicle tank of claim 1, further comprising a valve, arranged in the main tank at an end of the main flow line, to close the main flow line when no fuel is present at the valve.

3. The motor vehicle tank of claim 1, wherein the main tank is formed of metal.

4. The motor vehicle tank of claim 3, wherein the auxiliary tank reservoir is formed of metal.

5. The motor vehicle tank of claim 3, wherein the partition wall is formed of metal.

6. The motor vehicle tank of claim 1, wherein the main flow line and the auxiliary flow line are mechanically connected and fluidically connected outside outer delimiting walls of the motor vehicle tank.

7. The motor vehicle tank of claim 1, further comprising a common flow line to fluidically connect the main flow line and the auxiliary flow line inside outer delimiting walls of the motor vehicle tank.

8. The motor vehicle tank of claim 1, wherein the main tank can only be filled via the auxiliary tank.

* * * * *